United States Patent
Faitelson et al.

(10) Patent No.: US 9,892,139 B2
(45) Date of Patent: Feb. 13, 2018

(54) DISTRIBUTED INDEXING IN AN ENTERPRISE

(71) Applicant: VARONIS SYSTEMS, INC., New York, NY (US)

(72) Inventors: Yakov Faitelson, New York, NY (US); Ohad Korkus, New York, NY (US); Ophir Kretzer-Katzir, Tenafly, NJ (US)

(73) Assignee: VARONIS SYSTEMS, LTD., Herzliya (IL)

( * ) Notice: Subject to any disclaimer, the term of this patent is extended or adjusted under 35 U.S.C. 154(b) by 944 days.

(21) Appl. No.: 13/935,499

(22) Filed: Jul. 4, 2013

(65) Prior Publication Data
US 2015/0012632 A1    Jan. 8, 2015

(51) Int. Cl.
G06F 15/16 (2006.01)
G06F 17/30 (2006.01)
H04L 29/12 (2006.01)

(52) U.S. Cl.
CPC .... *G06F 17/30312* (2013.01); *H04L 61/1582* (2013.01)

(58) Field of Classification Search
CPC ................ G06F 17/30312; H04L 61/1582
USPC ........................................... 709/223
See application file for complete search history.

(56) References Cited

U.S. PATENT DOCUMENTS

| 8,001,088 B2 * | 8/2011 | Tawa, Jr. .......... G06F 17/30067 707/673 |
| 8,433,687 B1 * | 4/2013 | Pydi .......................... G06F 8/71 707/610 |
| 2006/0107297 A1 * | 5/2006 | Toyama ............ G06F 17/30265 725/105 |
| 2007/0250531 A1 * | 10/2007 | Wiggins ............ G06F 17/30011 |
| 2011/0219008 A1 | 9/2011 | Been et al. |

FOREIGN PATENT DOCUMENTS

WO     2008/009515     1/2008

OTHER PUBLICATIONS

Bowman C M et al: "The Harvest information discovery and access system", Computer Networks and ISDN Systems, North Holland Publishing. Amsterdam, NL, vol. 28, No. 1, pp. 119-125, (Dec. 1, 1995).

* cited by examiner

*Primary Examiner* — Bryan Lee
(74) *Attorney, Agent, or Firm* — Soroker Agmon Nordman

(57) ABSTRACT

A method for distributing indexing of objects for an enterprise, comprising providing by a computer to an indexing server of an enterprise index entries respective to at least one object of the computer that was indexed in the computer, thereby updating an index of the indexing server of the enterprise with respect to the at least one object of the computer, and an apparatus for performing the same.

12 Claims, 2 Drawing Sheets

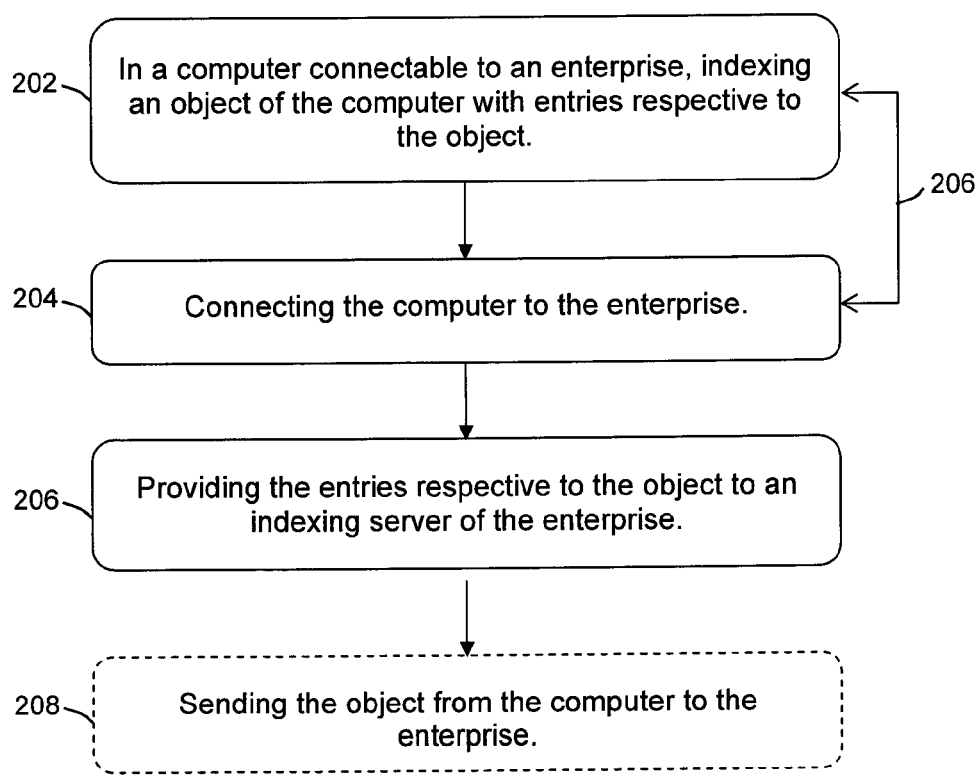

DISTRIBUTED INDEXING IN AN ENTERPRISE

BACKGROUND

The present disclosure generally relates to a computerized system, and more specifically to indexing of objects of the computerized system.

Computers systems or computerized systems, particularly such of an enterprise, generally comprise numerous linked computers that store and handle plenty of objects such as files. Thus, in some cases at least, in order to efficiently and quickly retrieve objects, an index or inventory of objects is constructed and maintained. Generally, tracking objects in the computerized system indexing the objects in an up-to-date manner is an ongoing process which may adversely affect the computerized system such as in terms of cost of equipment or response time.

SUMMARY

One exemplary embodiment of the disclosed subject matter is a method for distributing indexing of objects for an enterprise, comprising:

providing by a computer to an indexing server of an enterprise index entries respective to at least one object of the computer that was indexed in the computer, thereby updating an index of the indexing server of the enterprise with respect to the at least one object of the computer.

Another exemplary embodiment of the disclosed subject matter is an apparatus for distributing indexing of objects for an enterprise, comprising:

an indexing server of the enterprise;

an at least one computer having an at least one object, and configured to index the at least one object of the computer with entries respective to the at least object and for providing the entries to the indexing server of the enterprise.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, optionally with an additional letter or letters to distinguish between similar entities or variants of entities, and may not be repeatedly labeled and/or described.

Figure 1A:
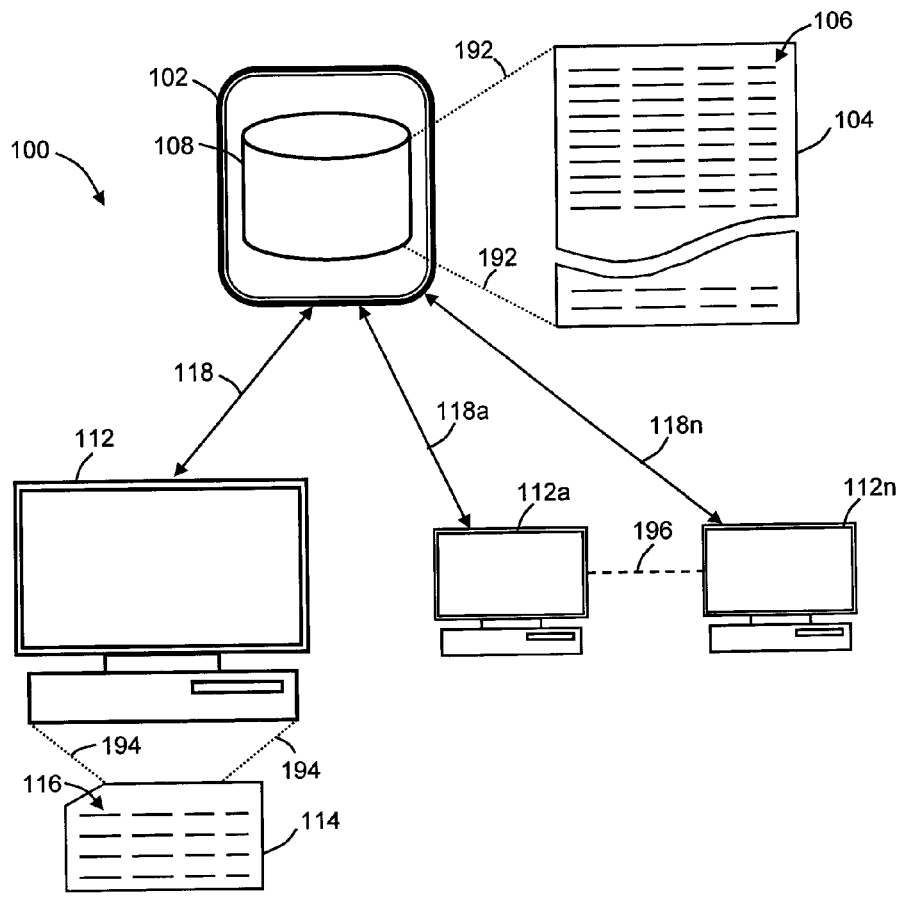

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

Figure 1B:
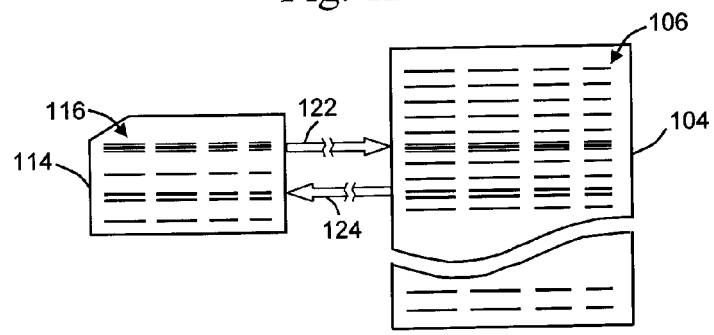

FIG. 1A schematically illustrates an arrangement of an indexing server having a storage and an at least one client computer connectable to the indexing server via a communication link, according to exemplary embodiments of the disclosed subject matter;

FIG. 1B schematically illustrates transfers of index entries, according to exemplary embodiments of the disclosed subject matter; and FIG. 2 schematically illustrates an outline of operations, according to exemplary embodiments of the disclosed subject matter.

DETAILED DESCRIPTION

In the context of the present disclosure, without limiting, the term 'enterprise' implies a computerized system comprising a plurality of computers communicating therebetween and having and/or sharing and/or communicating with a data storage device. The enterprise is also referred to as a 'computerized system' and the data storage device also referred to as 'data storage' or 'storage'.

For brevity, referring to an operation of the enterprise, such as sending of data, implies an operation of one or more components and/or computers of the enterprise.

Generally, without limiting, an enterprise comprises several computers in a range between about 10 computers and about 1000 computers or more. Optionally, an enterprise comprises less than 10 computers, not precluding having one computer as, for example, a mainframe computer.

In the context of the present disclosure, without limiting, the term 'object' implies a data element of the enterprise, such as a document, a file, a database, an access permission, or a user identification.

In the context of the present disclosure, without limiting, the term 'indexing' implies compiling data about and/or of objects in an inventory or a catalog or an index.

By way of a figurative example, a index may resemble a collection of cards or records of a book library, where each card or record comprises information about the book in the library such as title, authors, publisher, code, summary of contents, keywords, classification, shelf location, borrowing restrictions or allowances, borrowing and returns histories and so forth.

Likewise, for example and without limiting, an index comprises entries corresponding to or respective to objects, such as names of objects, addresses of objects in a storage device and/or links to a network storage device, access histories of the objects, access permissions to the objects, classification of an object, attributes of the objects such as set by an operating system, and particularly keywords and/or phrases and/or extracts and/or citations and/or excerpts from the object, collectively also denoted as metadata with respect to an object. According to the context and/or circumstances, reference to metadata may involve reference to a part of the metadata.

Generally, without limiting, the metadata, or part thereof, is referred to as an index, possibly though not necessarily where the metadata is constructed in a certain format. Generally, without limiting, an index is constructed and/or stored in a manner allowing expedient retrieval of the metadata, or part thereof, of objects.

In the context of the present disclosure, without limiting, the term 'indexing server' denotes one or more data processing apparatuses configured to index objects of the enterprise, optionally storing them in one or more storage devices such as in a database.

In the context of the present disclosure, without limiting, the term 'client computer' refers to a computer and/or a computerized device such a smartphone or tablet computer, linked and/or linkable to the enterprise such as to a component of the enterprise by a communication facility or facilities, such as by a network and/or the internet or wireless or mobile communication or any combination of communications. Generally, the client computer is configured for data transfers and/or exchange with the enterprise and/or a component thereof. Thus, generally and without limiting, at least as data or objects of a client computer are concerned, a client computer is regarded or considered as a part of the enterprise, though not necessarily a physical part thereof, optionally temporarily or for a certain time.

In the context of the present disclosure, without limiting, the term 'connect' or 'link' implies either directed communication connection and/or indirect communication such as via a network and/or interconnections of components.

In some embodiments, without limiting, a client computer is operated and/or controlled by a human operator which is also referred to a user.

The terms cited above denote also inflections and conjugates thereof.

One technical problem dealt by the disclosed subject matter is reducing the indexing load on an indexing server of an enterprise comprising and/or connected to a plurality of client computers. The indexing load relates to the amount of computations and/or amount of communication transfers and/or consumption of communications bandwidth as well as calculation of the indexing.

One technical solution according to the disclosed subject matter is configuring the plurality of client computers to perform locally on the plurality of the client computers indexing of objects that are stored therein and/or on storage of the enterprise via communication. The plurality of the client computers generate local indexes of the objects, and subsequently provide the local indexes to the indexing server of the enterprise, thereby updating the indexing server of an enterprise. Thus, the indexing load is distributed, at least partly, among the plurality of the client computers, reducing the indexing load on the indexing server of the enterprise.

In some embodiments, the objects of the client computers are generated and/or received at the client computers and/or modified locally on the client computes.

Optionally or additionally, a component of the enterprise, such as the indexing server, provides objects or part thereof to the client computers for indexing and/or the indexing server provides partial index of an object for the client computer to further locally index the object such as by contents of the object.

A client computer may provide the local indexes to the indexing server or other local indexes such as of another client computer, responsive to one more events and/or conditions. For example, periodically such once an hour or a day, or responsive to a request by the indexing server of an enterprise, or responsive to updating or creating an objects on the client computer, or responsive to accessing an object located in the enterprise storage by the local client computer.

It is noted that the plurality of client computers are linked to the enterprise, such as to one or more components of the enterprise, are also linked to the indexing server. The client computers are linked to the enterprise by any communication facility or combination of communication facilities, such as by a LAN, a WAN, or a cellular communication or any combination thereof. A client computer may be linked to the enterprise permanently and/or for a short term and/or in an ad-hoc manner.

It is noted that referring to the plurality of client computers does not preclude one client computer.

A potential technical effect of the disclosed subject matter is a decreased computational load and reduced communication bandwidth consumption in the enterprise, enabling faster responses and/or requiring less sophisticated and/or costly equipment. Further, distributing the indexing in client computers allows parallelism of the indexing, thereby substantially increasing the efficiency of indexing, potentially achieving near-real-time updates of the index of the indexing server.

A general non-limiting presentation of practicing the present disclosure is given below, outlining exemplary practice of embodiments of the present disclosure and providing a constructive basis for variant and/or alternative and/or divergent embodiments, some of which are subsequently described.

FIG. 1A schematically illustrates an arrangement 100 of an indexing server 102 of a computerized system in a role of an enterprise, and a client computer 112 connectable to indexing server 102 via a communication link 118. The connection of client computer 112 to indexing server 102 may be direct and/or indirect via the interconnections of components and/or computes of the enterprise.

In some embodiments, client computer 112 comprises a plurality of client computers, denoted as a client computer 112a to a client computer 112n, representing any number of client computer as illustrated by a dashed line 196, and connectable to indexing server 102, directly and/or indirectly, via a communication link 118a to a communication link 118n, respectively.

As illustrated by doted lines 192, indexing server 102 comprises storage 108 and maintains an index 104 of objects of the enterprise with entries of index 104 illustrated as entries 106.

As illustrated by doted lines 194, client computer 112 also maintains an index 114 of objects thereof, with entries of index 114 illustrated as entries 116.

In some embodiments, once an object is created and/or received in client computer 112, index 114 is created in case it was not already present in client computer 112, and a corresponding entry is created in index 114.

In some embodiments, once an object is updated in client computer 112, a corresponding entry is updated in index 114.

In some embodiments, when index 104 corresponding to an object of the enterprise which also resides in client computer 112 is updated, index 114 of client computer 112 is updated accordingly. For example, when the object of the enterprise is updated, the enterprise notifies client computer 112 via communication and provides the corresponding updated entry. Optionally, in case client computer 112 is not linked to the enterprise, the enterprise updates client computer 112 responsive to re-linking of client computer 112 to the enterprise.

FIG. 1B schematically illustrates transfer of entries 116 of index 114 to index 104 and transfer of entries 106 of index 104 to index 114, according to exemplary embodiments of the disclosed subject matter, as exemplified below.

In some embodiments, client computer 112 updates index 104 of indexing server 102 with entries corresponding to entries of index 114 respective to an object of client computer 112, as illustrated virtually by an arrow 122.

In some embodiments, updating of index 104 of indexing server 102 by client computer 112 with respect to an object thereof involves also sending the object to the enterprise, either in conjunction and/or separately.

In some embodiments, the enterprise sends an object to client computer 112 to be maintained and/or indexed therein. Optionally a corresponding entry from index 104 of indexing server 102 is transferred to index 114 of client computer 112, as illustrated virtually by an arrow 124.

In some embodiments, client computer 112 requests an object from the enterprise, such as responsive to an interaction of a user of client computer 112 to that effect.

Consequently, a suitable component of the enterprise sends the object to client computer 112, and indexing server 102 sends the corresponding entry from index 104 to index 114 of client computer 112.

In some embodiments, the enterprise initiates the transfer of the object to client computer 112. Consequently, a suitable component of the enterprise sends the object to client computer 112 and initiates indexing server 102 to transfer the corresponding entry from index 104 to index 114 of client computer 112.

In some embodiments, the entry from index 104 of indexing server 102 that is transferred to index 114 of client computer 112 is incomplete, and client computer 112 further indexes the object in index 114, such as by searching contents of the object and/or attributes thereof.

In some embodiments, an object is received from the enterprise for indexing the object, such as by contents thereof, statistics of the contents of the object and/or other elements or ingredients of the object such as attributes of the object where the attributes may include, for example, access permissions or access history of the object.

In some embodiments, rather than send transferring an object to client computer 112 from the enterprise, client computer 112 accesses on-line the object in the enterprise and uses the computational resources of client computer 112 to index the object.

For example, to reduce interference with the operation of the enterprise, client computer 112 only reads the object's contents and/or attributers thereof and indexes the object in index 114. Consequently client computer 112 updates index 104 of indexing server 102 with corresponding entries from index 114. In this manner client computer 112 may index a plurality of objects in the enterprise, and update index 104 with a bulk of entries with respective to the plurality of objects.

It is noted that an update of an object implies, beyond modification of the object per se such as contents thereof, also modification of metadata of the object such as modification of access permission, classification of the object and so forth.

Likewise, it is noted that an update of an index entry corresponding to an object implies updates regarding metadata of the object, such as keywords, phrases, access history, attributes and so forth.

In some embodiments, client computer 112 indexes objects responsive to a request from the enterprise, such as from indexing server 102, whereas in some embodiments, client computer 112 indexes objects autonomously such as responsive to circumstances such as an update of objects or receiving of objects or access to objects in client computer 112. Likewise, in some embodiments, when client computer 112 operates on-line with and/or accesses objects of the enterprise client computer 112 updates index 114 thereof, and subsequently updates index 104 of the enterprise accordingly.

In some embodiments, the enterprise initiates a transfer of an object with corresponding index entries to client computer 112 responsive to some conditions or circumstances. For example, assuming that a particular object of the enterprise is designated for transfer to client computer 112. Thus, when a suitable component of the enterprise detects that client computer 112 was connected and identified or recognized such as by IP value and/or credentials of client computer 112 and/or of operator thereof, the enterprise sends the particular object and indexing server 102 is initiated to send the corresponding entry from index 104.

In some embodiments, the credentials comprise elements such as access permission of client computer 112 and/or user thereof to the object, or any element that authorizes or permits access to the object such as previous access to the object. As another example, the enterprise initiates a transfer of an object with corresponding index entries to client computer 112 responsive to usage of and/or access to an object in the enterprise.

In some embodiments, upon a preset and/or a determined condition or circumstance, client computer 112 sends at least a part and/or all of entries 116 of index 114 to indexing server 102, thereby updating index 104 of indexing server 102 with respect to the object.

In some embodiments, preset conditions or circumstances for updating of index 104 by client computer 112 comprise but not limited to one or more of: a date such as first or last day of a month, time of day such as midnight, periodically such as every hour, or any combination thereof.

Optionally, the preset conditions are applied only in case where index 114 was modified since the last updating of index 104 by client computer 112. Optionally or additionally, the preset conditions are applied only in case where index 114 was modified since the last updating of index 104 by client computer 112 and only modified or new entries 116 since the last updating of index 104 are used to update index 104.

In some embodiments, determined conditions or circumstances for updating of index 104 by client computer 112 comprise but not limited to one or more of: modification of index 114, a request for updating from indexing server 102, failure of communication with a component of the enterprise such as with indexing server 102, determination that too long time elapsed since the last update, such as a week or a month, for ascertaining that updates were not omitted for any reason whatsoever, or any combination thereof.

The preset conditions and determined conditions may be applied in any combinations thereof.

In some embodiments, a user of client computer 112 can interact with client computer 112 to initiate updating of index 104 of indexing server 102 by client computer 112, such as by invoking a suitable operation to that effect. Usually, in some embodiments, only modified or new entries 116 since the last updating are used to update index 104 responsive to the user's interaction. Optionally, the user of client computer 112 can initiate updating of index 104 with all the entries 116 of index 114.

A non-limiting exemplary scenario an operation of arrangement 100 is described below.

An accountant of the enterprise logs on a client computer permanently connected or linked to the accounting server of the enterprise.

The accountant fills in a document, such as a spreadsheet, financial transactions and the client computer creates and/or updates index 114 thereof with respect to the document. After verifying that the transactions are correct the accountant initiates transfer of the document to the accounting server and updating of index 104 of indexing server 102, such as by a designated operation for example a keyboard function key.

Another non-limiting exemplary scenario of an operation of arrangement 100 is described below.

A sales person of the enterprise visits a customer and offers some products of the enterprise to the customer.

The customer agrees, and the sales person connects his or her portable computer to the enterprise as a client computer, such as by a wireless communication, and prepares a document of quotes for the products. Responsively, the portable computer updates index 114 thereof and updates index 104 of indexing server 102 with respect to the document. Optionally, the portable computer also sends the document to the sales department of the enterprise immediately and/or later on.

In some embodiments, the portable computer also receives index entries respective to the object from the indexing server responsive to sending the object to the enterprise.

In an alternate variation of the scenario, the sales person prepares several documents in visiting several customers, and at the end of a round of visits connects the portable computer to the enterprise as a client computer and initiates an update of index 104, optionally with sending of the documents to the enterprise.

Yet another non-limiting exemplary scenario of an operation of arrangement 100 is described below.

A comptrolling company for the enterprise prepares a financial report. A document such as a spreadsheet is composed on a computer of the comptrolling company that is connected as a client computer to the enterprise, such as by the internet. The computer creates and/or revises index 114 thereof and updates index 104 of indexing server 102 with respect to the documents. Optionally, the computer sends the document to the accounting department of the enterprise.

Yet another non-limiting exemplary scenario of an operation of arrangement 100 is described below.

A web designer on behalf of the enterprise connects his or her computer to the enterprise expecting an object of a drawing that was agreed upon with the marketing department.

When the web designer connects his or her computer as a client computer to the enterprise and once a suitable component of the enterprise, such as a server of the marketing department, recognizes the connection, the component sends the object to the computer and notifies the indexing server to send the corresponding entries of the index of the indexing server.

It is noted that when referring that an indexing sever, such as indexing server 102, sends or receives index entries, in some embodiments it implies sending or receiving via one or more components of the enterprise and/or communications thereof.

It is noted that the description regarding client computer 112 applies and/or may apply to any of client computer 112a to client computer 112n.

In some embodiments, client computer 112 and any or part of client computer 112a to client computer 112n are comprised and/or included in the enterprise, at least partly and/or at least for some time.

In some embodiments, indexing server 102 comprises and/or represents a plurality of indexing servers.

In some embodiments, storage 108 is a part of storage and/or storages of the enterprise.

It is noted that referring to an object is not limiting and does not preclude a plurality of objects.

It is noted that referring to index entries with respect to an object is not limiting and does not preclude one entry.

It is noted that transfers of indexes and/or objects may be carried out in a push and/or pull manner according to circumstances such as configuration of a client computer and/or the indexing server.

In some embodiments, tens or hundreds or more client computers are connected to the enterprise, either simultaneously and/or occasionally and/or sporadically. Thus, by delegating or distributing the indexing of objects to the client computers, the enterprise and particularly the indexing server, may or does save an appreciable computational load. For example, by avoiding detecting connections of client computers and exploring or inquiring the client computers for objects and contents thereof and indexing the objects.

For clarification, it is noted that in some embodiments and with necessary changes made or considered, the indexing of objects by the plurality of client computers may resemble to some extent the operation of 'grid computing'.

Without limiting, some aspects of the description above may be phrased concisely with respect to an object of client computer 112, that without limiting represent also a plurality of object, as follows: providing indexing server 102 of the enterprise, by client computer 112, with entries 116 of index 114 thereof respective to an object of client computer 112 which was indexed in client computer 112, and that at least optionally responsive to creating and/or receiving and/or updating the object in client computer 112 and/or request by the enterprise and/or update of an object of the enterprise access on-line by client computer 112.

Thus index 104 of indexing server 102 of the enterprise is updated with respect to the object of client computer 112. Further, in some embodiments, client computer 112 provides the enterprise with the object.

FIG. 2 schematically illustrates an outline of operations of arrangement 100, exemplifying some elaborations of the above phrasing, according to exemplary embodiments of the disclosed subject matter.

In operation 202, in a computer connectable to a computerized system as an enterprise, an object of the computer is indexed in an index of the computer with entries respective to the object.

In some embodiments, the object is created in the computer and/or the object is received at the computer. In some embodiments, an existing object is updated in the computer.

In some embodiments, the object is received at the computer from the enterprise, and optionally entries of an index of the indexing server respective to the object are provided to the index of the computer.

In some embodiments, the object is requested from the enterprise by the computer. Optionally or alternatively, the enterprise initiates transfer of the object to the computer, optionally according to one or more conditions or circumstances as described above.

In operation 204, the computer is connected to the enterprise, such as to a component of the enterprise. For example, to a computer and/or to a server of the enterprise.

In operation 206, the entries respective to the object are provided to an indexing server of the enterprise, thereby updating the index of the indexing server with respect to the object.

In some embodiments, updating the index of the indexing server by the computer is according to one or more conditions or circumstances as described above.

In operation 208, optionally, the object is sent from the computer to the enterprise, either in conjunction with and/or separately from updating the index of the indexing server by the computer.

In some embodiments, operation 204 of connecting the computer to the enterprise precedes operation 202 of indexing an object of the computer, as illustrated by a double-arrow 206.

It is noted that an object of the computer implies also an object of the enterprise accessed and/or operated on-line by the computer.

There is thus provided according to the present disclosure a method for distributing indexing of objects for an enterprise, comprising:

providing by a computer to an indexing server of an enterprise index entries respective to at least one object of the computer that was indexed in the computer, thereby updating an index of the indexing server of the enterprise with respect to the at least one object of the computer.

In some embodiments, the at least one object was indexed in the computer responsive to any one of: creating the at least one object in the computer, receiving the at least one object in the computer, updating the at least one object in the computer or a request by the enterprise.

In some embodiments, the at least one object is received in the computer from the enterprise.

In some embodiments, index entries of the indexing server respective to the at least one object are further received in the computer from the enterprise.

In some embodiments, the method further comprises providing the at least one object to the enterprise.

In some embodiments, the at least one object of the computer is an at least one object of the enterprise accessed on-line by the computer.

In some embodiments, updating the at least one object comprises updating metadata of the at least one object.

There is thus further provided according to the present disclosure an apparatus for distributing indexing of objects for an enterprise, comprising:

an indexing server of the enterprise;

an at least one computer having an at least one object, and configured to index the at least one object of the computer with entries respective to the at least one object and for providing the entries to the indexing server of the enterprise.

In some embodiments, the at least one computer is configured to index the at least one object in response to any one of: creating the at least one object in the at least one computer, receiving the at least one object in the at least one computer, updating the at least one object in the at least one computer of a request by the enterprise.

In some embodiments, the at least one computer is further configured to provide the at least one object to the enterprise.

In some embodiments, the apparatus is further configured to on-line access an at least one object of the enterprise by the at least one computer.

In some embodiments, updating the at least one object comprises updating metadata of the at least one object.

In the context of some embodiments of the present disclosure, by way of example and without limiting, terms such as 'operating' or 'executing' imply also capabilities, such as 'operable' or 'executable', respectively.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

As used herein, without limiting, a process represents a collection of operations for achieving a certain objective or an outcome.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A method for distributing indexing of objects for an enterprise, comprising:

indexing in a computer at least one object of the computer with local entries respective to the at least one object, wherein the at least one object is located at a storage of the enterprise;

detecting accessing to the at least one object by the computer; and responsive to the detection of accessing, updating the local entries and updating access permissions, and providing, by the computer, to an indexing server of an enterprise index entries respective to at least one object of the computer that was indexed in the computer, thereby updating an index of the indexing server of the enterprise with respect to the at least one object of the computer.

2. The method according to claim 1, wherein the at least one object was indexed in the computer responsive to any one of: creating the at least one object in the computer, receiving the at least one object in the computer, updating the at least one object in the computer or a request by the enterprise.

3. The method according to claim 1, wherein the at least one object is received in the computer from the enterprise.

4. The method according to claim 3, wherein index entries of the indexing server respective to the at least one object are further received in the computer from the enterprise.

5. The method according to claim 1, further comprising providing the at least one object to the enterprise.

6. The method according to claim 1, wherein the at least one object of the computer is an at least one object of the enterprise accessed on-line by the computer.

7. The method according to claim 1, wherein updating the at least one object comprises updating metadata of the at least one object.

8. An apparatus for distributing indexing of objects for an enterprise, comprising:

an indexing server of the enterprise;

an enterprise storage, wherein at least one object is located therein; and an at least one computer
configured to index the at least one object with local entries respective to the at least one object, and responsive to a detection of accessing to the at least one object by the computer, to update the local entries to update access permissions, and to provide the entries respective to the at least one object to the indexing server of the enterprise.

9. The apparatus according to claim 8, wherein the at least one computer is configured to index the at least one object in response to any one of: creating the at least one object in the at least one computer, receiving the at least one object in the at least one computer, updating the at least one object in the at least one computer or a request by the enterprise.

10. The apparatus according to claim 8, wherein the at least one computer is further configured to provide the at least one object to the enterprise.

11. The apparatus according to claim 8, further configured to on-line access an at least one object of the enterprise by the at least one computer.

12. The apparatus according to claim 8, wherein updating the at least one object comprises updating metadata of the at least one object.

* * * * *